United States Patent
Fujita

(10) Patent No.: US 9,540,009 B2
(45) Date of Patent: Jan. 10, 2017

(54) TRANSMISSION SYSTEM FOR VEHICLE

(71) Applicant: YAMAHA HATSUDOKI KABUSHIKI KAISHA, Iwata-shi, Shizuoka-ken (JP)

(72) Inventor: Takashi Fujita, Iwata (JP)

(73) Assignee: YAMAHA HATSUDOKI KABUSHIKI KAISHA, Iwata-shi, Shizuoka-ken (JP)

( * ) Notice: Subject to any disclaimer, the term of this patent is extended or adjusted under 35 U.S.C. 154(b) by 0 days.

(21) Appl. No.: 14/970,401

(22) Filed: Dec. 15, 2015

(65) Prior Publication Data
US 2016/0167654 A1 Jun. 16, 2016

(30) Foreign Application Priority Data
Dec. 16, 2014 (JP) ................. 2014-254387

(51) Int. Cl.
| | |
|---|---|
| B60W 10/02 | (2006.01) |
| B60W 10/10 | (2012.01) |
| B60W 30/18 | (2012.01) |
| F16H 59/40 | (2006.01) |
| F16H 59/54 | (2006.01) |
| F16H 61/02 | (2006.01) |
| F16H 59/50 | (2006.01) |

(52) U.S. Cl.
CPC .............. *B60W 30/18* (2013.01); *B60W 10/02* (2013.01); *B60W 10/10* (2013.01); *F16H 59/40* (2013.01); *F16H 59/54* (2013.01); *F16H 61/0213* (2013.01); *B60W 2520/10* (2013.01); *B60W 2520/28* (2013.01); *B60W 2710/021* (2013.01); *B60W 2710/1005* (2013.01); *F16H 2059/405* (2013.01); *F16H 2059/506* (2013.01); *F16H 2061/0239* (2013.01)

(58) Field of Classification Search
None
See application file for complete search history.

(56) References Cited

U.S. PATENT DOCUMENTS

| | | | |
|---|---|---|---|
| 4,984,161 A | 1/1991 | Nakazawa et al. | |
| 2010/0049375 A1* | 2/2010 | Tanimoto | B60T 7/12 701/1 |

(Continued)

FOREIGN PATENT DOCUMENTS

JP  2012-057654 A  3/2012

*Primary Examiner* — Edwin A Young
(74) *Attorney, Agent, or Firm* — Rabin & Berdo, P.C.

(57) ABSTRACT

A transmission system for vehicle includes a clutch disposed in a power transmission path between an engine and a vehicle wheel, a transmission disposed in the power transmission path, a clutch actuator, a shift actuator, a vehicle wheel speed sensor, a sudden deceleration detecting unit that detects a sudden deceleration of the vehicle wheel based on an output signal of the vehicle wheel speed sensor, and a shift control unit. The shift control unit executes an ordinary shift control to shift to a speed adaptive shift stage associated with the rotational speed and to execute, when the sudden deceleration detecting unit detects the sudden deceleration of the vehicle wheel, a sudden deceleration adaptive shift control to shift to a shift stage lower than an actual shift stage at the point of detection of the sudden deceleration and higher than the speed adaptive shift stage associated with the rotational speed.

19 Claims, 9 Drawing Sheets

(56) References Cited

U.S. PATENT DOCUMENTS

2013/0304335 A1* 11/2013 Suzuki ................ B60W 10/184
                                                    701/51
2014/0297079 A1* 10/2014 Saitoh ................... B60W 20/15
                                                    701/22

* cited by examiner

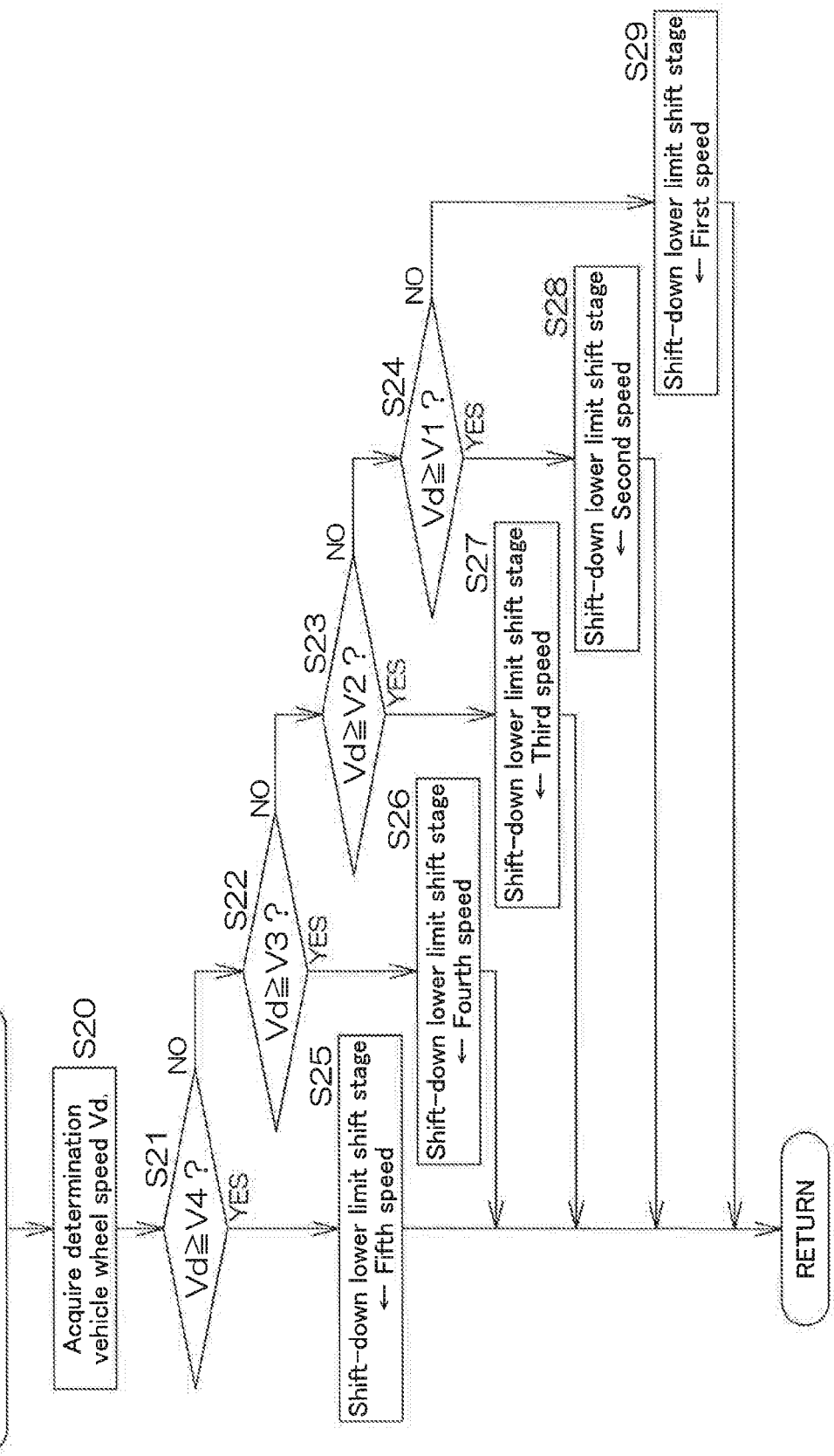

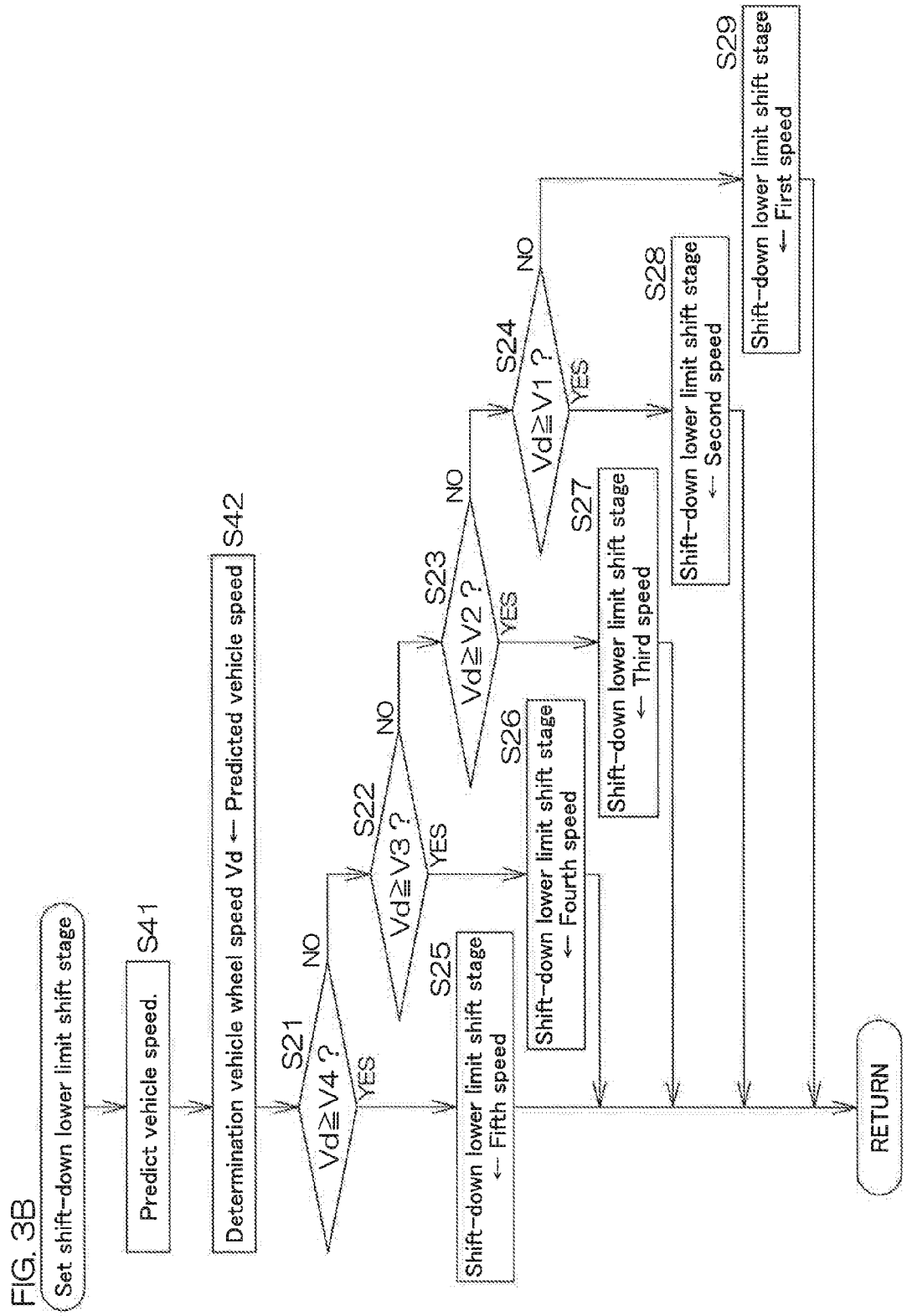

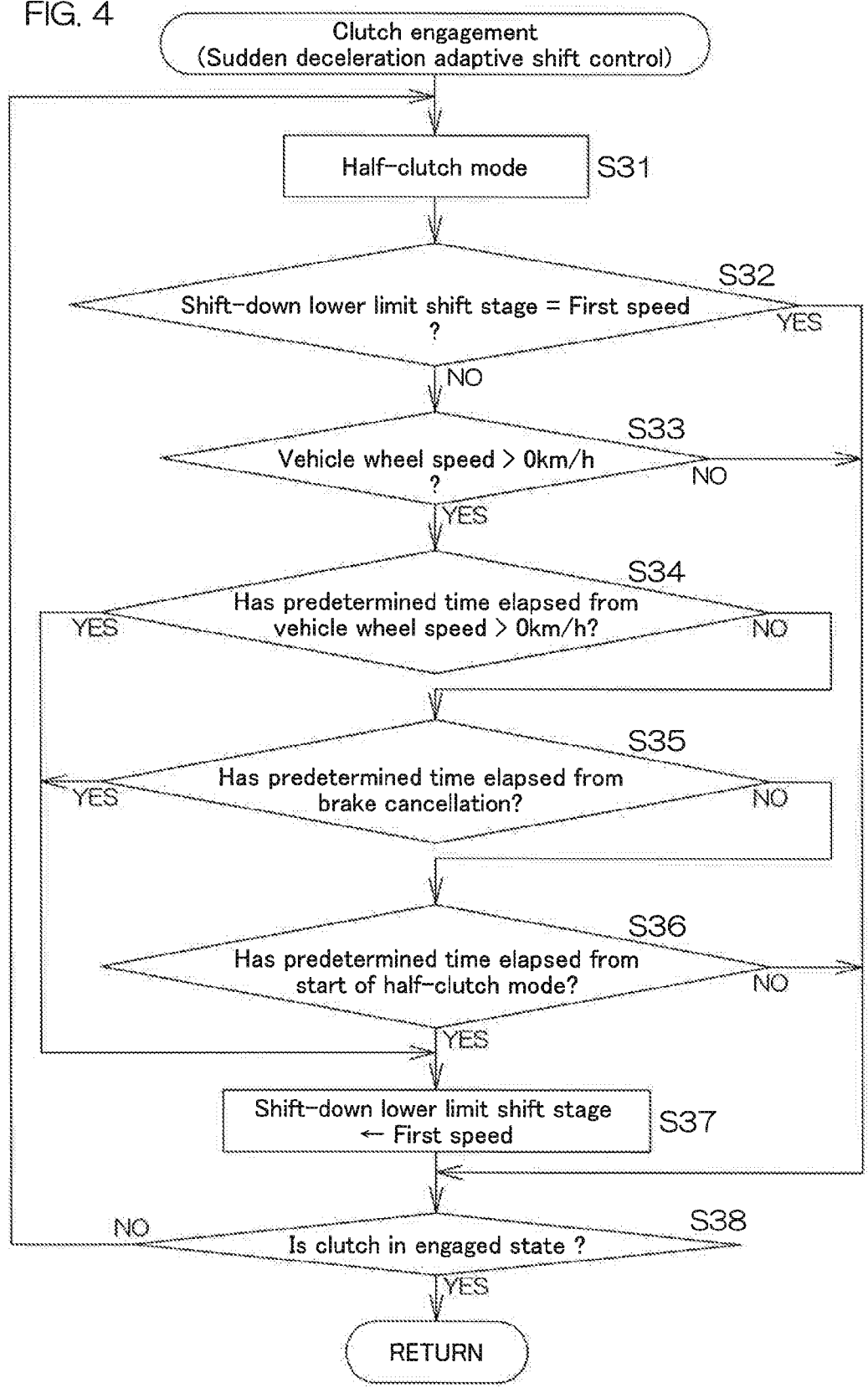

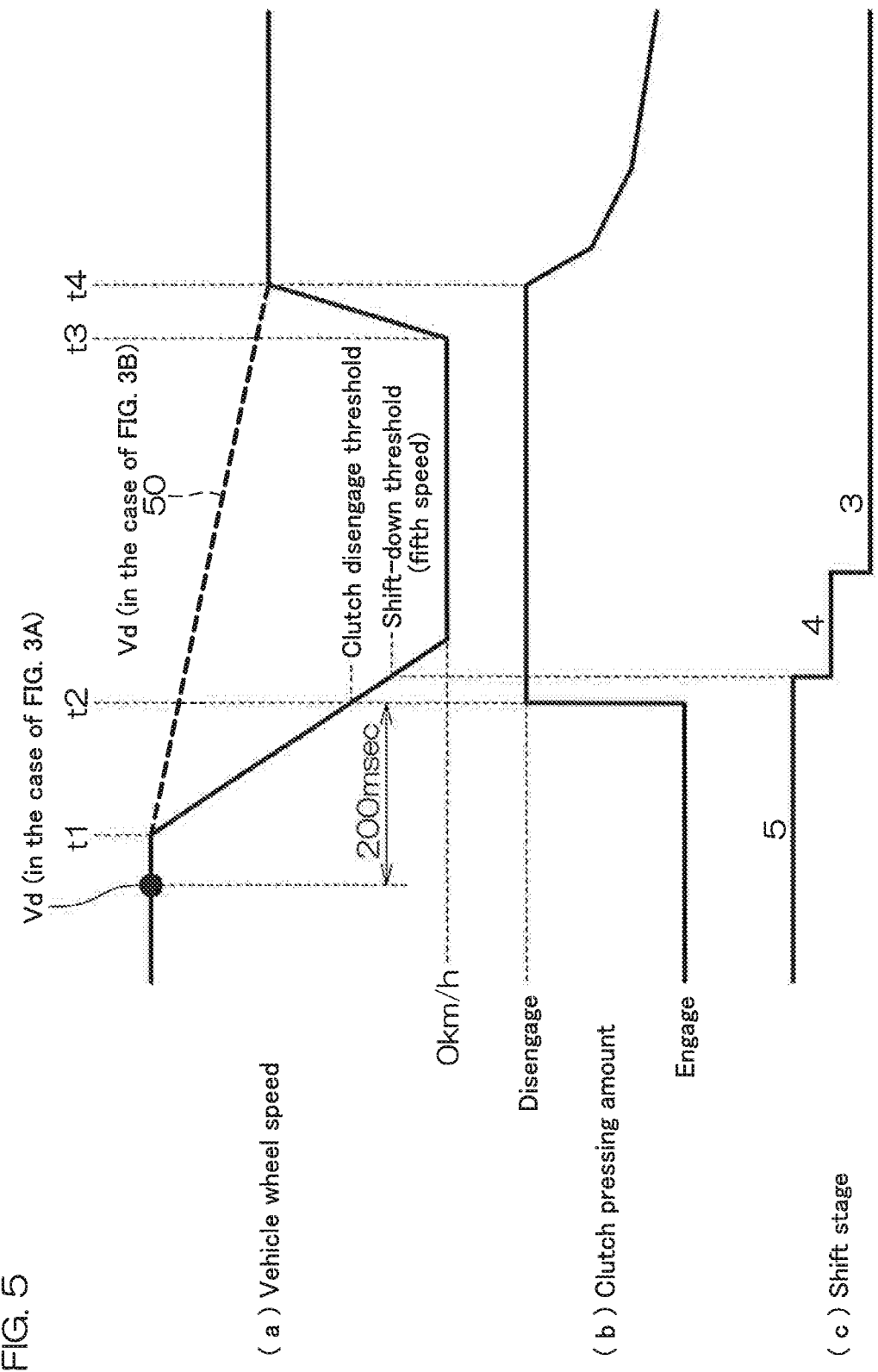

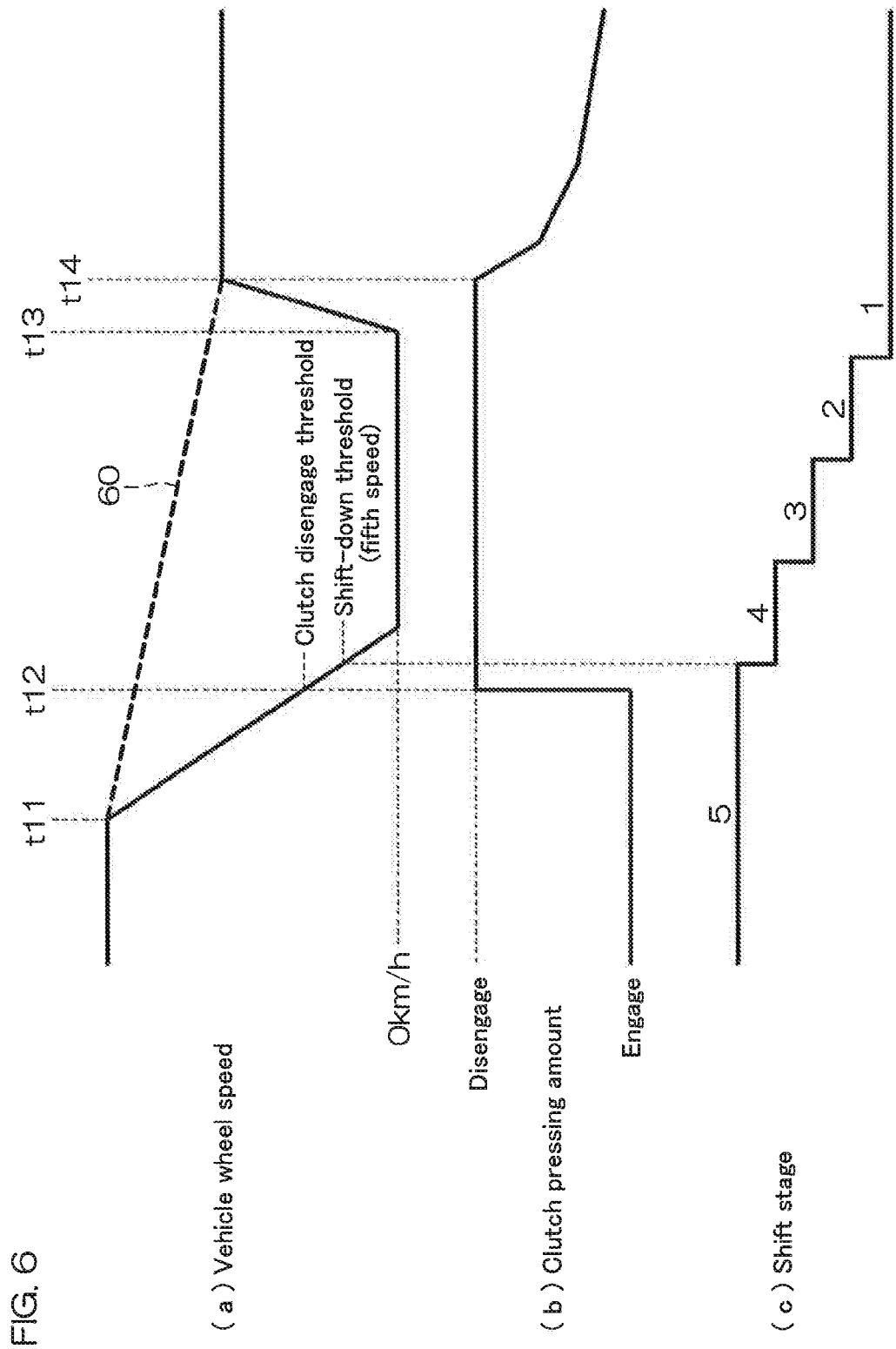

TRANSMISSION SYSTEM FOR VEHICLE

BACKGROUND OF THE INVENTION

1. Field of the Invention

The present invention relates to a transmission system for vehicle that performs automatic shifting by controlling a clutch actuator and a shift actuator.

2. Description of Related Art

Japanese Patent Application Publication No. 2012-57654 discloses a control unit that controls a shift stage switching of an automatic transmission in accordance with an accelerator opening and a vehicle speed. An accelerator sensor detecting an operation amount of an accelerator pedal and a vehicle speed sensor detecting a rotational speed of an output shaft of the transmission as the vehicle speed are connected to the control unit. Based on the accelerator operation amount and the vehicle speed detected respectively by the sensors, the control unit references a shift map and calculates a target shift stage. The control unit controls air cylinders for a clutch device and a gear shift unit, respectively, so that the target shift stage is attained.

Slipping of a wheel of a vehicle may occur due to a braking operation performed by a driver. In such a case, the rotational speed of the output shaft of the transmission (vehicle wheel speed) decreases suddenly even though the actual vehicle speed is not decreased. When due to this, a lower speed stage is set as the target shift stage and shifting to the target shift stage is performed, engine over-revolution may occur due to torque input from the vehicle wheel when the slipping is resolved. Japanese Patent Application Publication No. 2012-57654 provides a solution to the problem.

That is, the control unit of Japanese Patent Application Publication No. 2012-57654 prohibits downshifting when the vehicle wheel is put in a slipping state due to a braking operation. Over-revolution of the engine due to inappropriate shift stage selection can thereby be avoided.

SUMMARY OF THE INVENTION

The inventor of preferred embodiments of the present invention described and claimed in the present application conducted an extensive study and research regarding a transmission system for vehicle, such as the one described above, and in doing so, discovered and first recognized new unique challenges and previously unrecognized possibilities for improvements as described in greater detail below.

With the arrangement of Japanese Patent Application Publication No. 2012-57654, downshifting is prohibited when the vehicle wheel is put in a slipping state due to a braking operation. However, even in a slipping state, the vehicle decelerates in many cases because a braking force of some degree is obtained and acceleration is not performed. In such a case, there is a possibility for subsequent reacceleration of the vehicle to be performed in a high shift stage that is not suited for the low vehicle speed at that point. The clutch may thereby be influenced adversely during the reacceleration.

A preferred embodiment of the present invention therefore provides a transmission system for vehicle that enables over-revolution of an engine due to sudden decrease of vehicle wheel speed to be avoided and reacceleration after deceleration to be performed at a low shift stage.

In order to overcome the previously unrecognized and unsolved challenges described above, a preferred embodiment of the present invention provides a transmission system for vehicle that includes a clutch disposed in a power transmission path between an engine and a vehicle wheel, a transmission disposed in the power transmission path, a clutch actuator that switches between engaging and disengaging the clutch, a shift actuator that switches a shift stage of the transmission, a vehicle wheel speed sensor that detects a rotational speed of the vehicle wheel, a sudden deceleration detecting unit that detects a predetermined sudden deceleration of the vehicle wheel based on an output signal of the vehicle wheel speed sensor, and a shift control unit programmed to execute an ordinary shift control of controlling the clutch actuator and the shift actuator to shift to a speed adaptive shift stage associated in advance with the rotational speed detected by the vehicle wheel speed sensor and to execute, when the sudden deceleration detecting unit detects the sudden deceleration of the vehicle wheel, a sudden deceleration adaptive shift control of controlling the clutch actuator and the shift actuator to shift to a shift stage lower than an actual shift stage at the point of detection of the sudden deceleration and higher than the speed adaptive shift stage associated with the rotational speed detected by the vehicle wheel speed sensor.

With the present arrangement, the speed adaptive shift stage is associated in advance with the rotational speed (vehicle wheel speed) detected by the vehicle wheel speed sensor. In the ordinary shift control, a shifting operation that is in accordance with the speed adaptive shift stage is performed. The shifting operation specifically includes driving of the clutch actuator and the shift actuator by control by the shift control unit. On the other hand, when sudden deceleration of the vehicle wheel is detected, the sudden deceleration adaptive shift control that differs from the ordinary shift control is performed. In the sudden deceleration adaptive shift control, shifting is performed to a shift stage that is higher than the speed adaptive shift stage associated with the rotational speed of the vehicle wheel. An excessively low shift stage is thus not selected and therefore over-revolution of the engine can be avoided when the clutch is engaged. Also in the sudden deceleration adaptive shift control, shifting is performed to a shift stage that is lower than the actual shift stage at the point of sudden deceleration detection. Therefore, after the vehicle decelerates, reacceleration at a high shift stage not suitable for the vehicle speed (vehicle body speed) after deceleration can be avoided and adverse influence on the clutch can thus be avoided.

For example, when by braking of the vehicle wheel, the vehicle wheel slips with respect to a road surface, the vehicle wheel decelerates suddenly. When such sudden deceleration is performed, switching to a low shift stage is performed. However, at this point, a shift stage that is higher than the speed adaptive shift stage associated with the rotational speed of the vehicle wheel is selected. Therefore, when the clutch is engaged after the braking is weakened so that the vehicle wheel recovers gripping of the road surface, over-rotation of the engine can be avoided. Also, even if reacceleration is to be performed after the vehicle is decelerated, the shift stage that is lower than that at the point of sudden deceleration detection is selected and therefore reacceleration at an excessively high shift stage can be avoided. Adverse influence on the clutch can thus be avoided.

Especially with a vehicle that is not equipped with an antilock braking system, the vehicle wheel may slip with respect to the road surface or the vehicle wheel may become locked during braking. In such circumstances, the rotational speed of the vehicle wheel detected by the vehicle wheel speed sensor does not match the vehicle body speed. Despite this, the present preferred embodiment is capable of performing appropriate shift control and over-revolution of the engine and reacceleration at a high shift stage can be prevented thereby.

Sudden deceleration is a deceleration that is not less than a predetermined deceleration (absolute value of a negative acceleration). The sudden deceleration detecting unit may be arranged to detect deceleration using the output signal of the vehicle wheel speed sensor and detect sudden deceleration when the deceleration is not less than a predetermined value. Or, the sudden deceleration detecting unit may be arranged to use other information, such as braking operation information, etc., in addition to the output signal of the vehicle speed sensor to infer a circumstance where deceleration not less than the predetermined deceleration is occurring and thereby detect sudden deceleration.

In a preferred embodiment, even if the sudden deceleration detecting unit detects sudden deceleration of the vehicle wheel, the shift control unit may keep the shift stage at the point of sudden deceleration detection. Also, even if the sudden deceleration detecting unit detects sudden deceleration of the vehicle wheel, the shift control unit may perform shift control to a speed adaptive shift stage associated with the rotational speed of the vehicle wheel. Specifically, even if the sudden deceleration detecting unit detects sudden deceleration of the vehicle wheel, the shift control unit may perform shift control upon selecting a lowest shift stage. That is, an arrangement where the shift control unit is programmed so as to be able to perform the sudden deceleration adaptive shift control when sudden deceleration of the vehicle wheel is detected corresponds to being the preferred embodiment of the present invention.

In a preferred embodiment of the present invention, when a clutch disengage condition is met, the shift control unit actuates the clutch actuator to disengage the clutch. Thereafter, the shift control unit actuates the shift actuator to change the shift stage of the transmission. The shift stage is thereby changed. When a clutch engage condition is met thereafter, the shift control unit actuates the clutch actuator to engage the clutch.

In a preferred embodiment of the present invention, the shift control unit is programmed to perform, in the ordinary shift control, lowering of the shift stage by one stage when the rotational speed of the vehicle wheel decreases to a shift-down threshold set in association with each shift stage.

In a preferred embodiment of the present invention, the shift control unit is programmed to perform, in the sudden deceleration adaptive shift control, shifting to a shift stage that is in accordance with the rotational speed detected by the vehicle wheel speed sensor at a time around the detection of the sudden deceleration by the sudden deceleration detecting unit (for example, at a predetermined time before the detection of the sudden deceleration). Shifting to an appropriate shift stage can thereby be performed in accordance with the circumstances at the point of detection of sudden deceleration.

In a preferred embodiment of the present invention, the shift control unit is programmed to perform, in the sudden deceleration adaptive shift control, shifting to a shift stage that is in accordance with the rotational speed detected by the vehicle wheel speed sensor at a predetermined time before the clutch disengage condition for disengaging the clutch is met. With the present arrangement, shifting to an appropriate shift stage can be performed in accordance with the circumstances when the sudden deceleration is detected and based on the rotational speed of the vehicle wheel before the clutch is disengaged.

In a preferred embodiment of the present invention, the clutch disengage condition includes the condition that the rotational speed of the vehicle wheel has decreased to a clutch disengage vehicle speed. The clutch disengage vehicle speed may be set in accordance with the shift stage and the deceleration of the vehicle wheel. For example, the clutch disengage vehicle speed may be greater the higher the shift stage and may be set greater during sudden deceleration than at times other than during sudden deceleration.

In a preferred embodiment of the present invention, the shift control unit, in the sudden deceleration adaptive shift control, includes a vehicle speed predicting unit predicting the vehicle speed after the detection of the sudden deceleration by the sudden deceleration detecting unit and is programmed to perform shifting to a shift stage that is in accordance with the predicted vehicle speed.

With the present arrangement, the vehicle speed, that is, the vehicle body speed after detection of sudden deceleration is predicted. Shifting to an appropriate shift stage that is in accordance with the speed of the vehicle body can thus be performed. In particular, an appropriate shift stage can be selected using the vehicle body speed prediction result when the vehicle wheel speed and the vehicle body speed do not correspond due to sudden deceleration.

In a preferred embodiment of the present invention, the shift control unit is programmed to perform, in the sudden deceleration adaptive shift control, setting of a shift-down lower limit shift stage and selection of a shift stage not less than the shift-down lower limit shift stage. By the present arrangement, selection of an excessively low shift stage can be avoided and engine over-revolution can thus be avoided when the clutch is reengaged.

In a preferred embodiment of the present invention, the shift control unit is programmed to set the shift-down lower limit shift stage in accordance with the rotational speed detected by the vehicle wheel speed sensor at a time around the detection of the sudden deceleration by the sudden deceleration detecting unit. By the present arrangement, an appropriate shift-down lower limit shift stage can be set and engine over-revolution can thus be avoided more reliably when the clutch is reengaged.

In a preferred embodiment of the present invention, the shift control unit is programmed to set, as the shift-down lower limit shift stage, a shift stage that is one stage higher than a highest shift stage at which engine over-revolution occurs at the rotational speed of the vehicle wheel at a time around sudden deceleration detection.

In a preferred embodiment of the present invention, the sudden deceleration detecting unit detects locking of the vehicle wheel as sudden deceleration of the vehicle wheel. The sudden deceleration adaptive shift control can thereby be performed reliably when the vehicle wheel becomes locked and therefore engine over-revolution and reacceleration at a high shift stage can be avoided reliably. "Locking of the vehicle wheel" refers to the rotational speed of the vehicle wheel becoming zero or substantially zero when the vehicle body speed is not zero.

In a preferred embodiment of the present invention, the shift control unit is programmed to end the sudden deceleration adaptive shift control and return to the ordinary shift control when the vehicle wheel speed sensor detects a rotational speed exceeding a predetermined speed. By the present arrangement, appropriate return to the ordinary shift control can be performed and an appropriate shift stage that is in accordance with the rotational speed of the vehicle wheel (speed adaptive shift stage) can thus be selected in the ordinary travel state. Engine over-revolution during sudden deceleration and high shift stage reacceleration can thus be avoided without influencing ordinary travel characteristics.

In a preferred embodiment of the present invention, the shift control unit is programmed to end the sudden deceleration adaptive shift control and return to the ordinary shift control upon elapse of a predetermined time after the detection of the rotational speed exceeding the predetermined speed by the vehicle wheel speed sensor. By the present arrangement, appropriate return to the ordinary shift control can be performed and an appropriate shift stage that is in accordance with the rotational speed of the vehicle wheel (speed adaptive shift stage) can thus be selected in the ordinary travel state. Engine over-revolution during sudden deceleration and high shift stage reacceleration can thus be avoided without influencing ordinary travel characteristics.

In a preferred embodiment of the present invention, the shift control unit is programmed to perform, in the sudden deceleration adaptive shift control, lowering of the shift stage one stage at a time at a predetermined shift-down time interval. In this case, the number of shift-down stages is restricted until a fixed time elapses from the detection of sudden deceleration by the sudden deceleration detecting unit. Downshifting to an excessively low shift stage can thus be avoided and engine over-revolution during clutch reengagement can be avoided.

In a preferred embodiment of the present invention, the shift control unit is programmed to execute, when engaging the clutch, a half-clutch mode of controlling the clutch actuator so that the clutch is put in a half-clutch state and to end the sudden deceleration adaptive shift control and return to the ordinary shift control upon elapse of a predetermined time from the start of the half-clutch mode. With the present arrangement, the sudden deceleration adaptive shift control is ended at the predetermined time from the start of the half-clutch mode and therefore appropriate return to the ordinary shift control can be performed after the minimum necessary sudden deceleration adaptive shift control. Engine over-revolution during sudden deceleration and high shift stage reacceleration can thus be avoided without influencing ordinary travel characteristics.

The above and other elements, features, steps, characteristics and advantages of the present invention will become more apparent from the following 15 detailed description of the preferred embodiments with reference to the attached drawings.

BRIEF DESCRIPTION OF THE DRAWINGS

FIG. 3A is a flowchart for describing an example of a shift-down lower limit shift stage setting process (step S14 of FIG. 2B).

FIG. 3B is a flowchart for describing another example of the shift-down lower limit shift stage setting process (step S14 of FIG. 2B).

FIG. 4 is a flowchart for describing a specific example of clutch engagement and shift-down lower limit shift stage cancellation (step S19 of FIG. 2B) in a sudden deceleration adaptive shift control.

FIG. 5 is a time chart for describing a specific example of sudden deceleration adaptive shift control.

FIG. 6 is a time chart for describing a shift control related to a comparative example.

DETAILED DESCRIPTION OF THE PREFERRED EMBODIMENTS

Figure 1:
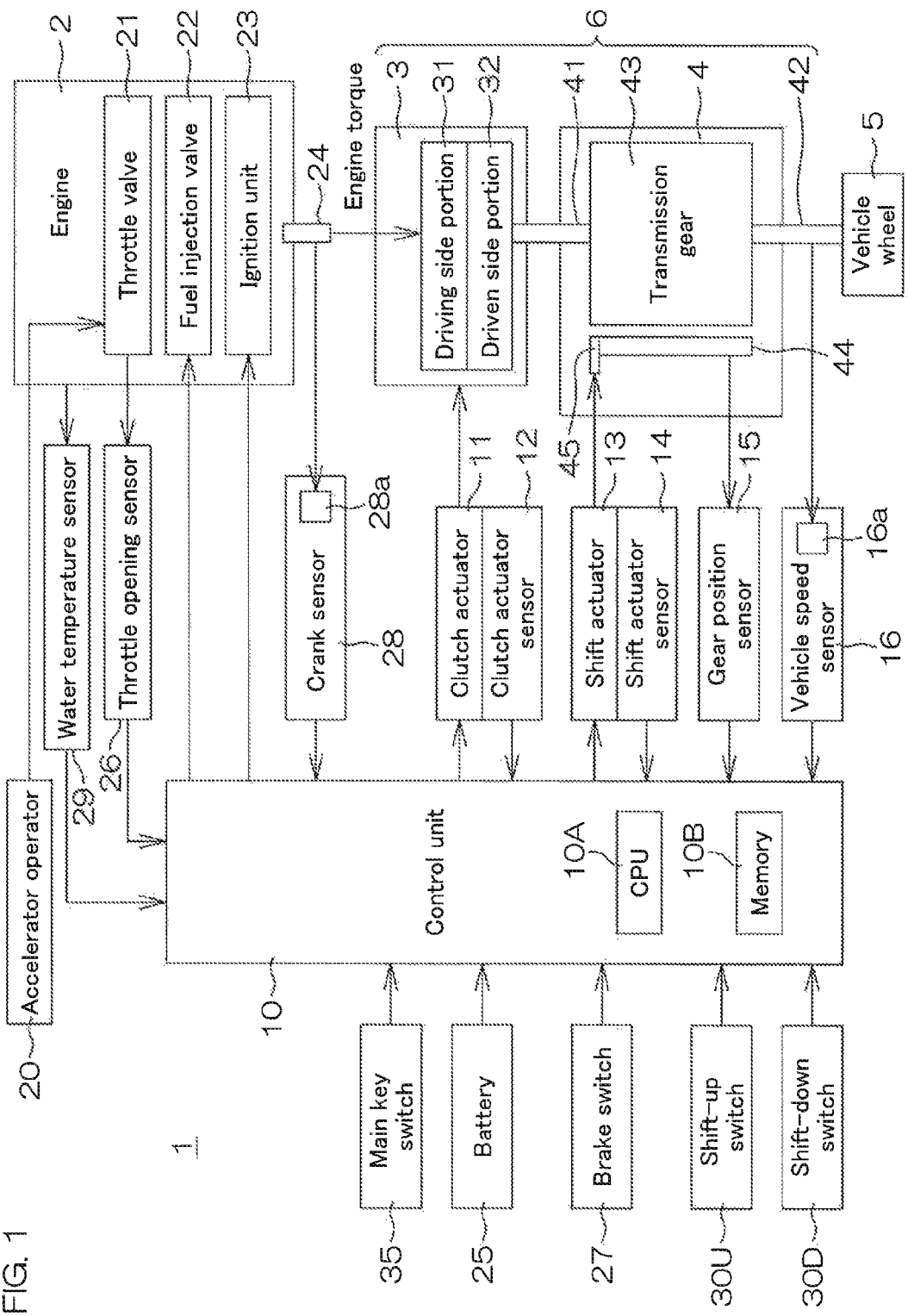
FIG. 1 is a block diagram of the arrangement of principal portions of a vehicle that includes a transmission system for vehicle according to a preferred embodiment of the present invention.

FIG. 1 is a block diagram of the arrangement of principal portions of a vehicle 1 that includes a transmission system for vehicle according to a preferred embodiment of the present invention. The vehicle 1 includes an engine (internal combustion engine) 2, a clutch 3, a transmission 4, and a vehicle wheel 5. A driving force generated by the engine 2 is transmitted to the vehicle wheel 5 via a power transmission path 6. The clutch 3 and the transmission 4 are disposed in the power transmission path 6. In the present preferred embodiment, the clutch 3 is disposed between the engine 2 and the transmission 4.

The engine 2 includes a throttle valve 21, a fuel injection valve 22, and an ignition unit 23. An accelerator operator 20, operated by a driver, is coupled to the throttle valve 21. There is thus a correspondence between the operation amount of the accelerator operator 20 (accelerator opening degree) and a throttle opening degree. The accelerator operator 20 may be an accelerator pedal. The fuel injection valve 22 injects fuel of an injection amount set according to the accelerator opening degree, etc., into the engine 2. The ignition unit 23 generates a spark discharge inside the engine 2 at a predetermined ignition timing in an engine cycle to ignite a mixed gas of the fuel and air.

The clutch 3 includes a driving side portion 31 and a driven side portion 32, and the driving side portion 31 and the driven side portion 32 are arranged to approach and separate from each other. A torque (engine torque) generated by the engine 2 is input into the driving side portion 31. More specifically, rotation of a crankshaft 24 of the engine 2 is transmitted to the driving side portion 31. A reduction gear may be provided between the crankshaft 24 and driving side portion 31. The driven side portion 32 is coupled to a main shaft 41 of the transmission 4.

The transmission 4 includes the main shaft 41, a drive shaft 42, a plurality of transmission gears 43, a shift cam 44, and a shifter 45. The plurality of transmission gears can be positioned at a plurality of gear positions respectively corresponding to a plurality of shift stages. The plurality of gear positions include, for example, a plurality of forward gear positions and at least one reverse gear position. Rotation of the main shaft 41 is converted to rotation of a shift ratio and direction that are in accordance with the gear position, and transmitted to the drive shaft 42. The drive shaft 42 is mechanically coupled to the vehicle wheel 5. The shifter 45 is an operating member that operates the shift cam 44. The positioning of the transmission gears 43 can be changed by displacement (for example, rotational displacement) of the shift cam 44, and the gear position (shift stage) can be selected thereby.

The vehicle 1 further includes a clutch actuator 11, a shift actuator 13, and a control unit 10. The control unit 10 is programmed to control the clutch actuator 11 and the shift actuator 13, and as such controls tangible elements. The control unit 10 is an example of a shift control unit. The actuators 11 and 13 may be electric actuators or hydraulic actuators. The control unit 10 includes a processor (CPU) 10A and a memory 10B. The processor 10A executes a program stored in the memory 10B, whereby the control unit 10 acts as a plurality of functional units as described later. That is, the control unit 10 may include non-transitory, tangible elements. The control unit 10 in some embodiments may be implemented as a general-purpose digital signal processor or dedicated signal processing circuit. In some embodiments, the control unit 10 may be a single processor. Such a single processor executes pre-loaded computer program to perform various processes; by performing the processes simultaneously or sequentially, the processor functions as different components; each function of the processor implemented by such a process is described as a separate unit. The control unit 10 may include several processors which operate similarly to the processor described above. The control unit 10 may include integrated circuit devices and memories mounted on a substrate or substrates. Further, the control unit 10 may be part of a computer which has other functional blocks. It will be understood that other units may be similarly formed to as described above.

The clutch actuator 11 makes the driving side portion 31 and the driven side portion 32 of the clutch 3 approach and separate from each other. The clutch actuator 11 is further arranged to increase and decrease a mutual pressing force of the driving side portion 31 and the driven side portion 32 in a state where these are in contact. The driving side portion 31 and the driven side portion 32 are thereby put in frictional contact and a torque transmitted therebetween is increased and decreased.

The clutch 3 is capable of taking on a disengaged state, an engaged state, and a half-clutch state. In the disengaged state, the driving side portion 31 and the driven side portion 32 are disengaged from each other and torque is not transmitted therebetween. In the engaged state, the driving side portion 31 and the driven side portion 32 are coupled without sliding and torque is transmitted therebetween.

The half-clutch state is an intermediate state between the engaged state and the disengaged state. In the half-clutch state, the driving side portion 31 and the driven side portion 32 are in sliding contact with each other and torque is transmitted partially therebetween. By controlling the clutch actuator 11, the state of the clutch 3 can be changed among the disengaged state, half-clutch state, and engaged state, and the pressing force of the driving side portion 31 and the driven side portion 32 in the half-clutch state can be changed.

A clutch actuator sensor 12 is provided to detect a position of an actuating element of the clutch actuator 11. The position of the actuating element of the clutch actuator 11 corresponds to a distance between the driving side portion 31 and the driven side portion 32 of the clutch. In the state where the driving side portion 31 and the driven side portion 32 are in contact, the distance corresponds to the pressing force of the driving side portion 31 and the driven side portion 32.

In the following description, a "clutch pressing amount" shall be introduced as a parameter for collectively referring to the distance between the driving side portion 31 and the driven side portion 32 and the pressing force therebetween. The clutch pressing amount is smaller the larger the distance of the driving side portion 31 and the driven side portion 32 and is larger the smaller the distance. In the state where the driving side portion 31 and the driven side portion 32 are in contact, the greater the mutual pressing force, the greater the clutch pressing amount.

Specifically, the clutch pressing amount corresponds to the distance between the driving side portion 31 and the driven side portion 32 and more specifically corresponds to a displacement amount of the actuating element of the clutch actuator 11. The control unit 10 drives the clutch actuator 11 based on an output signal of the clutch actuator sensor 12 to control the clutch pressing amount.

The shift actuator 13 actuates the shifter 45 to operate the shift cam 44 and thereby executes a shift operation for changing the gear position (shift stage). A shift actuator sensor 14 is provided to detect a position of an actuating element of the shift actuator 13. The position of the actuating element of the shift actuator 13 corresponds to a position of the shifter 45. The control unit 10 controls the shift actuator 13 based on an output signal from the shift actuator sensor 14. As such, the control unit 10 controls and drives tangible elements, including the clutch actuator 11 and the shift actuator 13.

The transmission 4 includes a gear position sensor 15 that detects the gear position and a vehicle speed sensor 16 that detects a vehicle speed. Output signals of these sensors are input into the control unit 10.

The gear position sensor 15 detects the gear position of the transmission 4. Specifically, the gear position sensor 15 may be a sensor that detects a position (for example, a rotational position) of the shift cam 44.

The vehicle wheel speed sensor 16 detects a vehicle wheel speed, which is a rotational speed of the vehicle wheel 5. For example, the vehicle wheel speed sensor 16 may be a sensor that detects a rotational speed of the drive shaft 42. The rotational speed of the drive shaft 42 is proportional to the rotational speed of the vehicle wheel 5 and the vehicle wheel speed can thus be detected by detecting the rotational speed of the drive shaft 42.

More specifically, the vehicle wheel speed sensor 16 includes a rotational pulse generating unit 16a that generates, in accordance with the rotation of the drive shaft 42, rotational pulses that are in accordance with rotational amount. The rotational pulses generated by the rotational pulse generating unit 16a are input into the control unit 10. The control unit 10 may, for example, count the rotational pulses input per unit time and calculate the vehicle wheel speed based on the counting result. Also, the control unit 10 may measure a duration required for input of a plurality of rotational pulses of a predetermined number and calculate the vehicle wheel speed based on the measured duration.

A main key switch 35, a battery 25, a throttle opening degree sensor 26, a brake switch 27, a crank sensor 28, a water temperature sensor 29, a shift-up switch 30U, a shift-down switch 30D, etc., are connected to the control unit 10.

The main key switch 35 is a key switch with which a conduct/interrupt operation using a main key is performed to turn on power to the vehicle 1. The battery 25 supplies electric power to the control unit 10 and other electric components. The control unit 10 monitors a voltage of the battery 25.

The throttle opening degree sensor 26 detects the throttle opening degree of the engine 2. The accelerator operator 20 is coupled to the throttle valve 21 of the engine 2 and therefore there is a correspondence between an operation amount (accelerator opening degree) of the accelerator operator 20 and the throttle opening degree. The throttle opening degree sensor 26 thus also functions as an accelerator opening degree sensor that detects the operation amount of the accelerator operator 20. The water temperature sensor 29 detects a temperature of cooling water of the engine 2.

The crank sensor 28 is a sensor that detects the rotation of the crankshaft 24 of the engine 2. The crank sensor 28 includes, for example, a rotational pulse generating unit 28a that generates, in accordance with the rotation of the crankshaft 24, rotational pulses that are in accordance with its rotational amount. The control unit 10 determines an engine speed based on the rotational pulses generated by the crank sensor 28. The engine speed is a value corresponding to a rotational speed of the driving side portion 31 of the clutch 3. The clutch sensor 28 is thus an example of a first rotational speed detecting unit that detects a driving side rotational speed that is the rotational speed of the driving side portion 31.

The shift-up switch 30U is a switch that is operated by the driver to shift the gear position (shift stage) of the engine 2 one stage to a higher speed side. The shift-down switch 30D is a switch that is operated by the driver to shift the gear position (shift stage) of the engine 2 one stage to a lower speed side. Output signals of the shift switches 30U and 30D are input into the control unit 10. In accordance with the input from the shift switch 30U or 30D, the control unit 10 drives the clutch actuator 11 and the shift actuator 13 to perform a shifting operation and change the gear position (shift position) among a plurality of forward gear positions.

To start the vehicle 1, the driver operates the shift switch 30U or 30D to select a gear position other than neutral. The control unit 10 thereby drives the shift actuator 13 to change the positioning of the transmission gears 43 of the transmission 4 to the selected gear position. The driver further operates the accelerator operator 20 to increase the accelerator opening degree. When the throttle opening degree increases accordingly, the engine speed increases. In accordance with the increase of engine speed, the control unit 10 controls the clutch actuator 11 to increase the clutch pressing amount and makes the driving side portion 31 and the driven side portion 32 approach each other.

The control unit 10 sets a target engine speed that is in accordance with the throttle opening degree and controls the clutch pressing amount so that the engine speed increases toward the target engine speed. The mutual pressing force of the driving side portion 31 and the driven side portion 32 thereby increases gradually and the clutch 3 enters the engaged state via the half-clutch state from the disengaged state.

The torque generated by the engine 2 is thus transmitted to the transmission 4 via the clutch 3. The rotation shifted by the transmission 4 is further transmitted to the vehicle wheel 5 and thereby the vehicle 1 moves. Thereafter, the control unit 10 sets the target engine speed that is in accordance with the throttle opening and makes the engine speed follow the target engine speed by control (fuel injection control) of the fuel injection valve 22 and control (ignition control) of the ignition unit 23.

When during travel, the driver operates the shift-up switch 30U or the shift-down switch 30D, a shift command is input into the control unit 10. In response thereto, the control unit 10 executes the shift operation. Specifically, the control unit 10 controls the clutch actuator 11 to disengage the clutch 3. Further, the control unit 10 controls the shift actuator 13 to change the positioning of the transmission gears 43 to the selected gear position corresponding to the shift command. Thereafter, the control unit 10 controls the clutch actuator 11 to put the clutch 3 in the engaged state via the half-clutch state. On the other hand, the control unit 10 decreases the target engine speed when upshifting is performed and increases the target engine speed when downshifting is performed to reduce a rotational speed difference of the driving side portion 31 and the driven side portion 32 of the clutch 3 and then actuates the clutch actuator 11 for clutch engagement. When the clutch 3 enters the engaged state and the shifting operation is completed, the control unit 10 sets the target engine speed in accordance with the throttle opening and the selected gear position and executes fuel injection control and ignition control based on the target engine speed.

The control unit 10 further includes an AMT (automated manual transmission) function of automatically controlling the gear position (shift stage) of the transmission 4 in accordance with the accelerator opening and the vehicle wheel speed. Especially when, with the clutch 3 being in the engaged state, the vehicle wheel speed falls below a shift-down threshold determined in advance according to each shift stage, the control unit 10 executes an auto shift-down control for lowering the shift stage automatically.

Figure 2A:
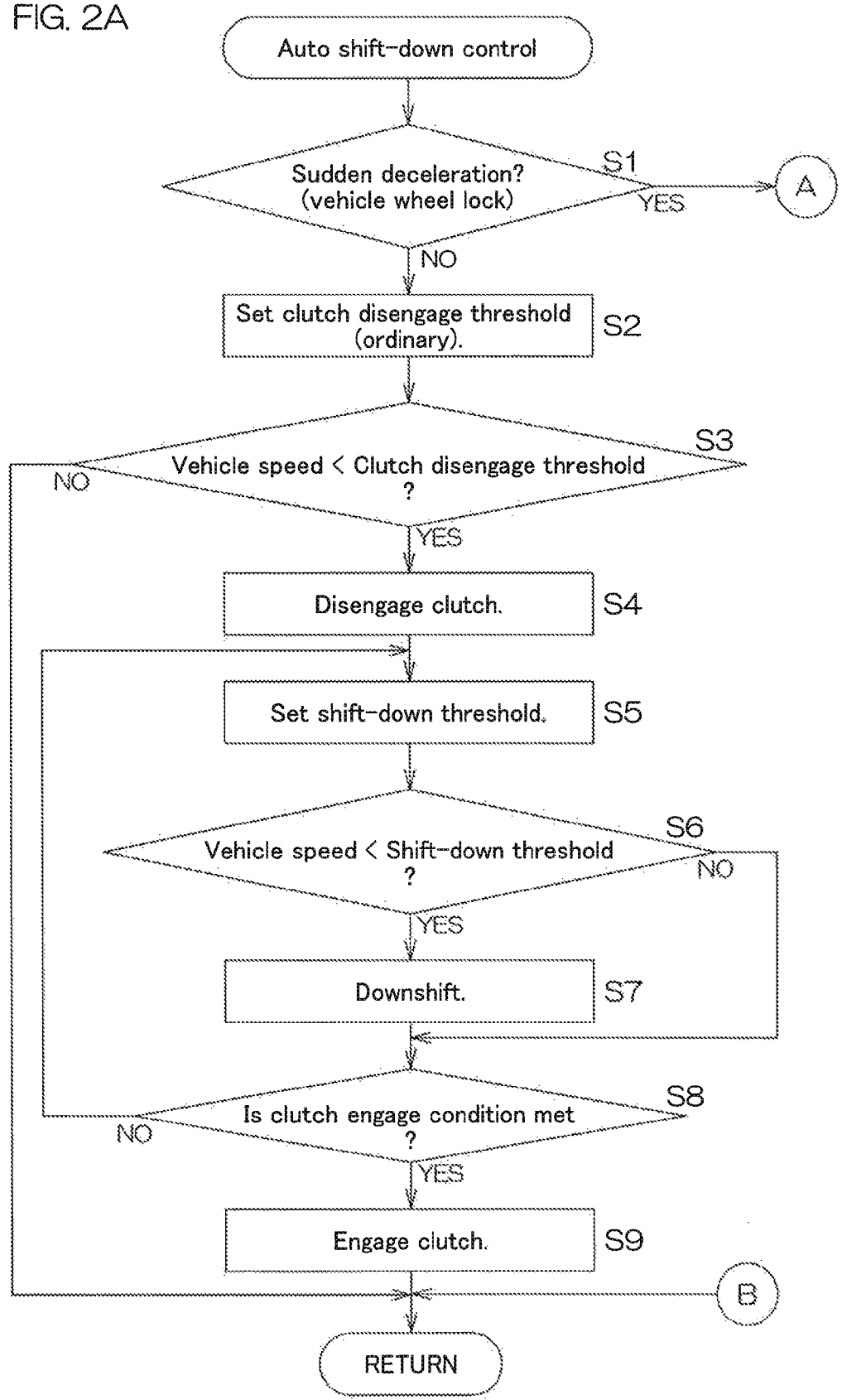
FIG. 2A and FIG. 2B are flowcharts for describing an auto shift-down control executed by a control unit included in the vehicle.
Figure 2B:
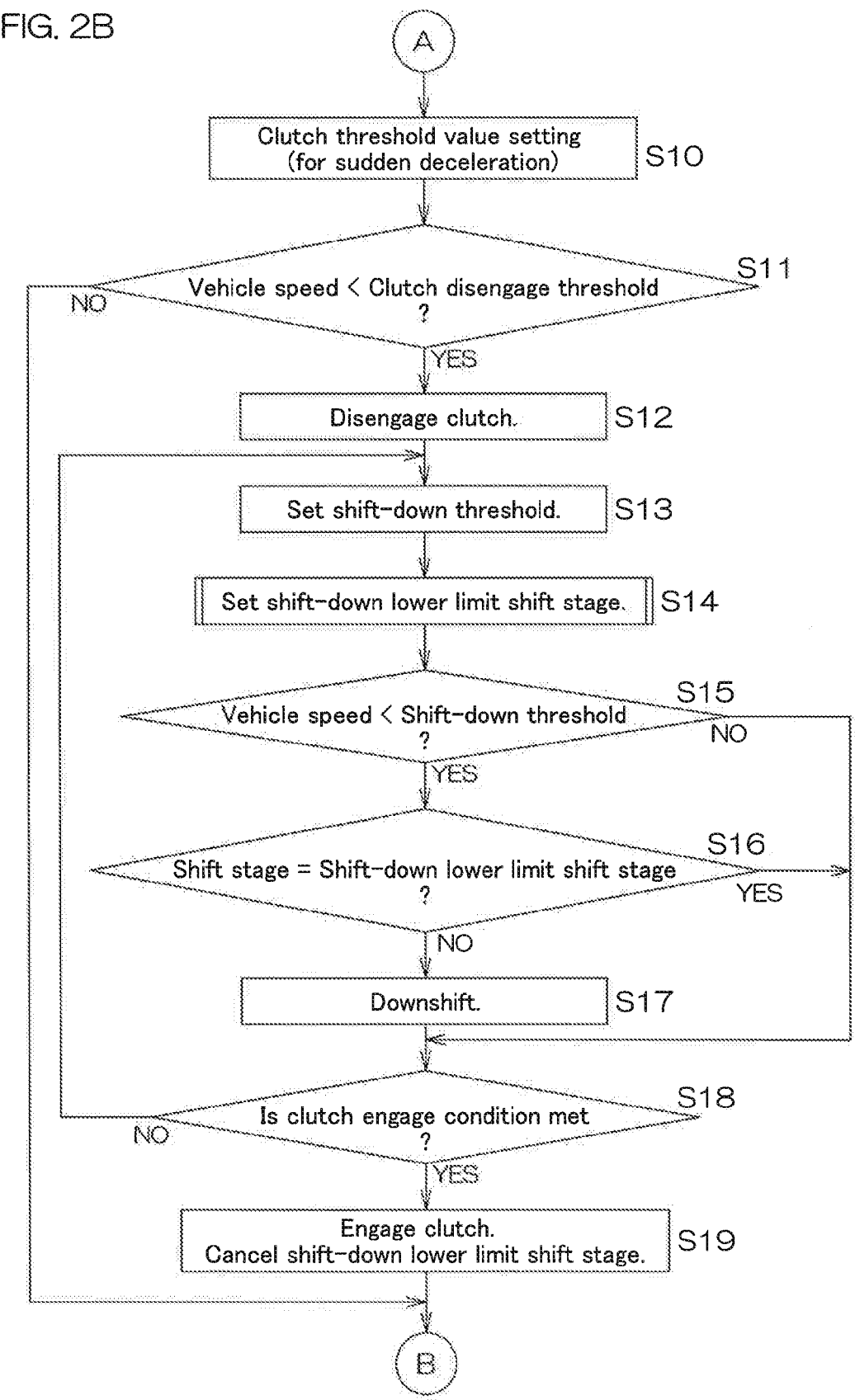

FIG. 2A and FIG. 2B are flowcharts for describing the auto shift-down control that the control unit 10 executes repeatedly at a predetermined control cycle (for example, of 10 milliseconds).

The control unit 10 judges whether or not the rotation of the vehicle wheel 5 is suddenly decelerating (step S1). This process is a function of the control unit 10 as a sudden deceleration detecting unit. For example, to determine deceleration of the vehicle wheel 5, the control unit 10 calculates a rate of change of the vehicle wheel speed detected by the vehicle wheel speed sensor 16. The deceleration is the absolute value of a negative acceleration and the greater the deceleration, the stronger the degree of deceleration. The control unit 10 may judge that the vehicle wheel 5 is decelerating suddenly when the deceleration is not less than a predetermined deceleration threshold. In particular in the present preferred embodiment, the control unit 10 judges that the vehicle wheel 5 is locked when the deceleration is not less than the deceleration threshold and the vehicle wheel speed is zero. The control unit 10 is programmed to detect the locking of the vehicle wheel 5 as sudden deceleration of the vehicle wheel 5. "Locking of the vehicle wheel 5" refers to the rotational speed of the vehicle wheel 5 becoming zero or substantially zero when the vehicle speed (vehicle body speed; vehicle ground speed) is not zero. Also, the control unit 10 may judge that the vehicle wheel 5 is decelerating suddenly when the deceleration of the vehicle wheel 5 is not less than the predetermined deceleration threshold and the brake switch 27 is detecting a braking operation.

If sudden deceleration of the vehicle wheel 5 is not detected (step S1: NO), the control unit 10 executes an ordinary shift control (steps S2 to S9). When sudden deceleration of the vehicle wheel 5 is detected (step S1: YES), the control unit 10 executes a sudden deceleration adaptive shift control (steps S10 to S19).

The ordinary shift control includes setting of a clutch disengage threshold (step S2). The clutch disengage threshold is a vehicle wheel speed threshold at which, in order to avoid excessive decrease of the engine speed, the clutch 3 should be disengaged when the vehicle wheel speed decreases. The clutch disengage threshold is determined according to each shift stage. The control unit 10 sets the clutch disengage threshold corresponding to the currently selected shift stage. A setting example of the clutch disengage thresholds in a case where five shift stages from first speed to fifth speed are provided is as follows.

Fifth speed: 24 km/h
Fourth speed: 20 km/h
Third speed: 16 km/h
Second speed: 13 km/h
First speed: 9 km/h The control unit 10 compares the current vehicle wheel speed detected by the vehicle wheel speed sensor 16 and the clutch disengage threshold corresponding to the current shift stage (step S3). If the current vehicle wheel speed is not less than the clutch disengage threshold (step S3: NO), the control unit 10 maintains the clutch 3 in the engaged state and keeps the current shift stage. If the current vehicle wheel speed is less than the clutch disengage threshold (step S3: YES), the control unit 10 controls the clutch actuator 11 to control the clutch 3 to be in the disengaged state (step S4). The vehicle wheel speed being less than the clutch disengage threshold is one of clutch disengage conditions. Besides this, the clutch disengage conditions may include the engine speed being less than a predetermined value. However, if the vehicle wheel speed is zero, a clutch disengage condition is met regardless of the engine speed.

Further, the control unit 10 sets a shift-down threshold (step S5). The shift-down threshold is a vehicle wheel speed threshold for judging whether or not downshifting to a shift stage that is one stage lower should be performed to avoid excessive decrease of the engine speed. The shift-down threshold is determined according to each shift stage. The control unit 10 sets the shift-down threshold corresponding to the currently selected shift stage. A setting example of the shift-down thresholds in the case where the five shift stages from the first speed to the fifth speed are provided is as follows.

Fifth speed (fifth speed to fourth speed): 25 km/h
Fourth speed (fourth speed to third speed): 21 km/h
Third speed (third speed to second speed): 17 km/h
Second speed (second speed to first speed): 14 km/h The control unit 10 compares the current vehicle wheel speed and the shift-down threshold (step S6). If the current vehicle wheel speed is less than the shift-down threshold (step S6: YES), the control unit 10 drives the shift actuator 13 to execute a shift-down operation of shifting to the shift stage that is one stage lower (step S7). If the current vehicle wheel speed is not less than the shift-down threshold (step S6: NO), the shift-down operation (step S7) is skipped and the current shift stage is kept.

Next, the control unit 10 judges whether or not a clutch engage condition is met (step S8). If the clutch engage condition is not met (step S8: NO), the control unit 10 repeats the processes from the setting of the shift-down threshold corresponding to the current shift stage (step S5). Downshifting to a shift stage that is in accordance with the current vehicle wheel speed is thereby performed in accordance with the setting of the shift-down threshold for each shift stage.

The control unit 10 is thus programmed to control the clutch actuator 11 and the shift actuator 13 to shift to a speed adaptive shift stage that is associated in advance with the vehicle wheel speed.

If the clutch engage condition is met (step S8: YES), the control unit 10 controls the clutch actuator 11 to control the clutch 3 to be in the engaged state (step S9). More specifically, the control unit 10 gradually increases the clutch pressing amount to put the clutch 3 in the half-clutch state and then increases the clutch pressing amount further in accordance with the engine speed to put the clutch 3 in the engaged state.

The clutch engage condition is a condition for engaging the clutch 3 that is in the disengaged state. Specifically, the clutch engage condition is met when the accelerator opening (throttle opening) is not less than a predetermined opening and the engine speed is not less than a predetermined engine speed. The clutch engage condition is also met when the vehicle wheel speed becomes not less than a predetermined clutch engage vehicle wheel speed.

The sudden deceleration adaptive shift control similarly includes the setting of the clutch disengage threshold (step S10) as well. The clutch disengage threshold is determined according to each shift stage. However in the present preferred embodiment, the clutch disengage threshold of each shift stage is determined to be a value greater than the clutch disengage threshold of the corresponding shift stage in the ordinary shift control. The control unit 10 sets the clutch disengage threshold corresponding to the currently selected shift stage. A setting example of the clutch disengage thresholds in the case where the five shift stages from the first speed to the fifth speed are provided is as follows.

Fifth speed: 37 km/h
Fourth speed: 31 km/h
Third speed: 25 km/h
Second speed: 19 km/h
First speed: 14 km/h The control unit 10 compares the current vehicle wheel speed detected by the vehicle wheel speed sensor 16 and the clutch disengage threshold corresponding to the current shift stage (step S11). If the current vehicle wheel speed is not less than the clutch disengage threshold (step S11: NO), the control unit 10 maintains the clutch 3 in the engaged state and keeps the current shift stage. If the current vehicle wheel speed is less than the clutch disengage threshold (step S11: YES), the control unit 10 controls the clutch actuator 11 to control the clutch 3 to be in the disengaged state (step S12). The vehicle wheel speed being less than the clutch disengage threshold is one of clutch disengage conditions. Besides this, the clutch disengage conditions may include the engine speed being less than a predetermined value. However, if the vehicle wheel speed is zero, a clutch disengage condition is met regardless of the engine speed.

Further, the control unit 10 sets the shift-down threshold (step S13). A shift-down threshold is determined according to each shift stage. In the present preferred embodiment, the shift-down threshold of each shift stage applied in the sudden deceleration adaptive shift control is of the same value as the shift-down threshold of the corresponding shift stage in the ordinary shift control. Obviously, the shift-down thresholds in the sudden deceleration adaptive shift control may be set to values different from the shift-down thresholds in the ordinary shift control. The control unit 10 sets the shift-down threshold corresponding to the currently selected shift stage.

The control unit 10 further sets a shift-down lower limit shift stage (step S14). The shift-down lower limit shift stage is the lower limit shift stage at which downshifting is allowed. Downshifting is allowed within a range of shift stages not less than the shift-down lower limit shift stage. Setting of the shift-down lower limit shift stage shall be described in detail later.

The control unit 10 compares the current vehicle wheel speed and the shift-down threshold (step S15). If the current vehicle wheel speed is less than the shift-down threshold (step S15: YES), the control unit 10 further judges whether or not the current shift stage is the shift-down lower limit shift stage (step S16). If the current vehicle wheel speed is less than the shift-down threshold (step S15: YES) and the current shift stage is a shift stage higher than the shift-down lower limit shift stage (step S16: NO), the control unit 10 executes the shift-down operation (step S17). That is, the control unit 10 drives the shift actuator 13 to execute the shift-down operation of shifting to the shift stage that is one stage lower. If the current vehicle wheel speed is not less than the shift-down threshold (step S15: NO), the shift-down operation (step S17) is skipped and the current shift stage is kept. Also, if the current shift stage is the shift-down lower limit shift stage, the shift-down operation (step S17) is omitted and the current shift stage is kept.

Next, the control unit 10 judges whether or not the clutch engage condition is met (step S18). If the clutch engage condition is not met (step S18: NO), the control unit 10 repeats the processes from the setting of the shift-down threshold corresponding to the current shift stage (step S13). Downshifting to a shift stage that is in accordance with the current vehicle wheel speed is thereby performed in accordance with the setting of the shift-down threshold for each shift stage and with the shift-down lower limit shift stage as the limit.

The clutch engage condition is the same as that in the case of ordinary shift control (step S8). Specifically, the clutch engage condition is met when the accelerator opening (throttle opening) is not less than the predetermined opening and the engine speed is not less than the predetermined engine speed. The clutch engage condition is also met when the vehicle wheel speed becomes not less than the predetermined clutch engage vehicle wheel speed.

If the clutch engage condition is met (step S18: YES), the control unit 10 controls the clutch actuator 11 to control the clutch 3 to be in the engaged state (step S19). More specifically, the control unit 10 gradually increases the clutch pressing amount to put the clutch 3 in the half-clutch state and then increases the clutch pressing amount further in accordance with the engine speed to put the clutch 3 in the engaged state. Further, the control unit 10 cancels the setting of the shift-down lower limit shift stage. In other words, the control unit 10 sets the shift-down lower limit shift stage to the first speed, which is a default value. The control unit 10 thus ends the sudden deceleration adaptive shift control and returns to the ordinary shift control.

FIG. 3A is a flowchart for describing an example of the shift-down lower limit shift stage setting process (step S14 of FIG. 2B). The control unit 10 acquires a determination vehicle wheel speed Vd (step S20) that is to be a basis for setting the shift-down lower limit shift stage. The determination vehicle wheel speed Vd may, for example, be the vehicle wheel speed at a point preceding the point at which the clutch disengage condition (step S11 of FIG. 2B) was met by a predetermined time (for example, 1 second). Also, the determination vehicle wheel speed Vd may be the vehicle wheel speed at a point immediately before, that is, at a point preceding the point at which the sudden deceleration was detected (step S1 of FIG. 2A) by a predetermined time (for example, 1 second).

The control unit 10 compares the determination vehicle wheel speed Vd with a plurality of vehicle wheel speed thresholds V1 to V4 (V4>V3>V2>V1>0) (steps S21 to S24). The vehicle wheel speed threshold V1 may be determined to be a lower limit vehicle speed at which over-revolution (for example, of not less than 10000 rpm) of the engine 2 occurs when the shift stage is the first speed. Similarly, the vehicle wheel speed thresholds V2, V3, and V4 may respectively be determined to be a lower limit vehicle speed at which over-revolution of the engine 2 occurs when the shift stage is the second speed, third speed, and fourth speed. If the vehicle wheel speed is not less than the vehicle wheel speed threshold V4, over-revolution of the engine 2 may occur at a shift stage not higher than the fourth speed. Also, if the vehicle wheel speed is not less than the vehicle wheel speed threshold V3, over-revolution of the engine 2 may occur at a shift stage not higher than the third speed. Similarly, if the vehicle wheel speed is not less than the vehicle wheel speed threshold V2, over-revolution of the engine 2 may occur at a shift stage not higher than the second speed. And if the vehicle wheel speed is not less than the vehicle wheel speed threshold V1, over-revolution of the engine 2 may occur at the first speed. A setting example of the vehicle wheel speed thresholds V1 to V4 is as follows.

V1=62 km/h
V2=82 km/h
V3=106 km/h
V4=130 km/h

When the determination vehicle wheel speed Vd is not less than the vehicle wheel speed threshold V4, the control unit 10 sets the shift-down lower limit shift stage to the fifth speed (step S25). Also, when the determination vehicle wheel speed Vd is less than the vehicle wheel speed threshold V4 and not less than the vehicle wheel speed threshold V3, the control unit 10 sets the shift-down lower limit shift stage to the fourth speed (step S26). Also, when the determination vehicle wheel speed Vd is less than the vehicle wheel speed threshold V3 and not less than the vehicle wheel speed threshold V2, the control unit 10 sets the shift-down lower limit shift stage to the third speed (step S27). Also, when the determination vehicle wheel speed Vd is less than the vehicle wheel speed threshold V2 and not less than the vehicle wheel speed threshold V1, the control unit 10 sets the shift-down lower limit shift stage to the second speed (step S28). If the determination vehicle wheel speed Vd is less than the vehicle wheel speed threshold V1, the control unit 10 sets the shift-down lower limit shift stage to the first speed (step S29).

FIG. 3B is a flowchart for describing another example of the shift-down lower limit shift stage setting process (step S14 of FIG. 2B). In FIG. 3B, steps corresponding to the respective steps of FIG. 3A are indicated by the same symbols as in FIG. 3A.

In the present process example, the control unit 10 has a function of a vehicle speed predicting unit that predicts the current vehicle speed (vehicle body speed) after the sudden deceleration has been detected (step S41). The control unit 10 substitutes the predicted vehicle speed into the determination vehicle wheel speed Vd and uses the determination vehicle wheel speed to execute the same processes as in the case of FIG. 3A. However, the vehicle wheel speed thresholds V1 to V4 (V4>V3>V2>V1>0) may be of different values from those of the process example of FIG. 3A.

The predicted vehicle speed may specifically be calculated, for example, using the vehicle wheel speed, at a point preceding the point at which the clutch disengage condition (step S11 of FIG. 2B) was met by a predetermined time (for example, 1 second), as a reference vehicle speed. Also, the predicted vehicle speed may be calculated using the vehicle wheel speed, at a point immediately before, that is, at a point preceding the point at which the sudden deceleration was detected (step S1 of FIG. 2A) by a predetermined time (for example, 1 second), as the reference vehicle speed. More specifically, the vehicle speed may be predicted based on the reference vehicle speed and an elapsed time. For example, the vehicle speed may be predicted by subtracting a vehicle speed change amount that is in accordance with the elapsed time from the reference vehicle speed.

FIG. 4 is a flowchart for describing a specific example of clutch engagement and shift-down lower limit shift stage cancellation (step S19 of FIG. 2B) in the sudden deceleration adaptive shift control. The control unit 10 executes a half-clutch mode (step S31) of controlling the clutch actuator 11 so that the clutch 3 is put in the half-clutch state. In the half-clutch mode, the control unit 10 gradually increases the clutch pressing amount in accordance with the engine speed to put the clutch 3 in the engaged state.

The control unit 10 judges whether or not the shift-down lower limit shift stage is the first speed (step S32). If the shift-down lower limit shift stage is other than the first stage (step S32: NO), processes (steps S33 to S35) for cancelling the prohibition of downshifting are executed. Specifically, the control unit 10 judges whether or not the current vehicle wheel speed exceeds a predetermined value (for example, 0 km/h) (step S33; shift-down prohibition cancellation condition 1). Also, the control unit 10 judges whether or not a predetermined time (for example, 200 milliseconds) has elapsed from the meeting of the judgment condition of step S33 (vehicle wheel speed>0 km/h) (step S34; shift-down prohibition cancellation condition 2). Further, the control unit 10 judges whether or not a predetermined time (for example, 200 milliseconds) has elapsed from a point at which cancellation of braking operation was detected by the brake switch 27 (step S35; shift-down prohibition cancellation condition 3). Also, the control unit 10 judges whether or not a predetermined time (for example, 200 milliseconds) has elapsed from the start of the half-clutch mode (step S36; shift-down prohibition cancellation condition 4). The predetermined time is preferably determined to be not less than a response time required for the vehicle wheel speed to match the vehicle body speed from the start of the half-clutch mode. The judgments of the shift-down prohibition cancellation conditions 1 to 4 may be made in any order and the order shown in FIG. 4 is merely one example.

In the present preferred embodiment, if the shift-down prohibition cancellation condition 1 (step S33: vehicle wheel speed>0 km/h) is met and additionally any one of the shift-down prohibition cancellation conditions 2, 3, and 4 (steps S34, S35, and S36) is met, the control unit 10 resets the shift-down lower limit shift stage to the first speed (step S37) and ends the sudden deceleration adaptive shift control. Return to the ordinary shift control, in which downshifting to the first speed is allowed, is thereby performed. If the shift-down lower limit shift stage is the first speed (step S32: YES), the processes of steps S33 to S37 are omitted.

The control unit 10 judges whether or not the clutch 3 has entered the engaged state (step 38) and if it has not entered the engaged state, returns to step 31 and sustains the half-clutch mode. When the clutch 3 enters the engaged state, the ordinary shift control is performed thereafter. If the clutch 3 enters the engaged state before the shift-down lower limit shift stage is reset to the first speed, the shift-down lower limit shift stage is reset to the first speed regardless of whether or not the shift-down prohibition cancellation conditions are met.

The shift-down prohibition cancellation condition 1 and just one of any of the shift-down prohibition cancellation conditions 2 to 4 may be judged. Also, just one of any of shift-down prohibition cancellation conditions 1 to 4 may be judged or any combination of two or more of the conditions may be judged. For example, the shift-down prohibition cancellation condition 1 (step S33) may be omitted and just the shift-down prohibition cancellation condition 2 (step 34) may be judged. Also, the two conditions of the shift-down prohibition cancellation condition 1 (step 33) and the shift-down prohibition cancellation condition 3 (step 35) may be judged and the sudden deceleration adaptive shift control maybe ended when a positive judgment is made with both of these. Further, the two conditions of the shift-down prohibition cancellation condition 1 (step 33) and the shift-down prohibition cancellation condition 4 (step 36) may be judged and the sudden deceleration adaptive shift control may be ended when a positive judgment is made with both of these. Further another shift-down prohibition cancellation condition may be applied. For example, braking operation cancellation detection, accelerator operation detection, etc., may be included in a shift-down prohibition cancellation condition.

FIG. 5 is a time chart for describing a specific example of the sudden deceleration adaptive shift control. FIG. 5(*a*) shows a change of the vehicle wheel speed. FIG. 5(*b*) shows a change of the clutch pressing amount. FIG. 5(*c*) shows a change of the shift stage.

A case where high-speed travel is being performed with the shift stage being the fifth speed and the clutch 3 being in the engaged state shall be assumed. When at a time t1, the driver performs the braking operation and the vehicle wheel 5 is put in the locked state, the vehicle wheel 5 slips on the road surface. Although the vehicle wheel speed decreases suddenly at this point, the vehicle body speed is merely decreasing gradually as indicated by reference symbol 50. The control unit 10, which detects the sudden decrease of the vehicle wheel speed (step S1 of FIG. 2A), starts the sudden deceleration adaptive shift control. At a time t2, the vehicle wheel speed becomes less than the clutch disengage threshold (step S11 of FIG. 2B) and in response thereto, the control unit 10 disengages the clutch 3 (step S12 of FIG. 2B). The control unit 10 sets the shift-down threshold in accordance with the currently selected shift stage (step S13 of FIG. 2B) and while comparing the set shift-down threshold and the current vehicle wheel speed (step S15 of FIG. 2B), performs downshifting one stage at a time (step S17 of FIG. 2B).

The control unit 10 acquires the vehicle wheel speed immediately before the performing of the braking operation as the determination vehicle wheel speed Vd (step S20 of FIG. 3A). Also, if the processes of FIG. 3B are applied, a predicted vehicle speed is calculated using the vehicle wheel speed immediately before the braking operation as the reference vehicle speed (step S41) and the predicted vehicle speed is deemed to be the determination vehicle wheel speed Vd (step S42). By comparison of the determination vehicle wheel speed Vd and the vehicle wheel speed thresholds V1 to V4, the control unit sets the shift-down lower limit shift stage (steps S21 to S29 of FIG. 3A and FIG. 3B).

With the example of FIG. 5, the shift-down lower limit shift stage is set to the third speed. Downshifting below the third stage is thereby prohibited even after the vehicle wheel speed becomes zero (step S16 of FIG. 2B: YES). As mentioned above, the determination vehicle wheel speed Vd may be the vehicle wheel speed at a point preceding the time t2 at which the clutch disengage condition was met by a predetermined time (for example, 200 milliseconds) or may be the vehicle wheel speed at a point immediately before the time t1 at which the sudden deceleration was detected.

If before the vehicle 1 stops, the driver cancels braking at a time t3, the vehicle wheel 5 is accelerated due to friction from the road surface and the vehicle wheel speed increases and returns to a value equivalent to the vehicle body speed. When in a period from a time t4, the driver then operates the accelerator operator 20 to increase the accelerator opening (throttle opening), the clutch engage condition (step S18 of FIG. 2B) is met. In response, the control unit 10 puts the clutch 3 in the half-clutch state and then gradually into the engaged state. In this process, the shift-down prohibition cancellation conditions (steps S33 and S34 of FIG. 4) are met and the shift-down lower limit shift stage is reset to the first speed.

Thereafter, the driver operates the shift switches 30U and 30D as necessary to change to a desired shift stage.

FIG. 6 is a time chart for describing a shift control related to a comparative example. FIG. 6(a) shows a change of the vehicle wheel speed. FIG. 6(b) shows a change of the clutch pressing amount. FIG. 6(c) shows a change of the shift stage.

The present comparative example is a shift control where steps S1 and S10 to S19 (sudden deceleration adaptive shift control) are omitted from the auto shift-down control shown in FIG. 2A and FIG. 2B described above.

A case where high-speed travel is being performed with the shift stage being the fifth speed and the clutch 3 being in the engaged state shall be assumed. When at a time t11, the driver performs the braking operation and the vehicle wheel 5 is put in the locked state, the vehicle wheel 5 slips on the road surface. Although the vehicle wheel speed decreases suddenly at this point, the vehicle body speed is merely decreasing gradually as indicated by reference symbol 60. At a time t12, the vehicle wheel speed becomes less than the clutch disengage threshold (step S3 of FIG. 2A) and in response thereto, the control unit 10 disengages the clutch 3 (step S4 of FIG. 2A). The control unit 10 sets the shift-down threshold in accordance with the currently selected shift stage (step S5 of FIG. 2A) and while comparing the set shift-down threshold and the current vehicle wheel speed (step S5 of FIG. 2A), performs downshifting one stage at a time (step S7 of FIG. 2A). The vehicle wheel 5 is in the locked state and therefore downshifting to the first speed is performed during brake actuation.

When the driver cancels braking at a time t13, the vehicle wheel 5 is accelerated due to friction from the road surface, and the vehicle wheel speed increases suddenly and returns to a value equivalent to the vehicle body speed. When in a period from a time t14, the driver then operates the accelerator operator 20 to increase the accelerator opening (throttle opening), the clutch engage condition (step S8 of FIG. 2A) is met. In response, the control unit 10 puts the clutch 3 in the half-clutch state and then gradually into the engaged state. At this point, the shift stage is the first speed, upshifting is not performed automatically, and therefore the vehicle wheel speed is excessive in comparison to the shift stage. The engine 2 may thus fall into an over-revolution state due to a reverse input torque from the vehicle wheel 5.

As described above, with the arrangement of the present preferred embodiment, the sudden deceleration adaptive shift control that differs from the ordinary shift control is executed when sudden deceleration of the vehicle wheel 5 is detected. In the sudden deceleration adaptive shift control, the shift-down lower limit shift stage is set based on the determination vehicle wheel speed Vd and shifting to a shift stage lower than the shift-down lower limit shift stage is prohibited. A shift stage higher than the speed adaptive shift stage selected according to the vehicle wheel speed in the ordinary control may thus be selected in the sudden deceleration adaptive shift control. An excessively low shift stage is thus not selected and therefore even during high-speed travel, over-revolution of the engine 2 can be avoided when the clutch 3 is engaged. Also in the sudden deceleration adaptive shift control, shifting to a shift stage that is lower than the shift stage at the point of sudden deceleration detection is performed. Therefore in reacceleration after deceleration of the vehicle 1, a state in which a high shift stage not suited for the reacceleration is selected can be avoided and adverse influence on the clutch 3 due to reacceleration at a high shift stage can be avoided. Also, even in restarting after stopping the vehicle 1 due to sudden deceleration, starting at the high shift stage before the sudden deceleration can be avoided. Adverse influence on the clutch 3 due to starting at a high shift stage can thereby be alleviated as well.

The vehicle 1 is not required to be equipped with an antilock braking system. If an antilock braking system is not equipped, the vehicle wheel 5 may slip with respect to the road surface or the vehicle wheel 5 may become locked during braking. In such circumstances, the vehicle wheel speed detected by the vehicle wheel speed sensor 16 does not match the vehicle body speed. Despite this, the present preferred embodiment is capable of performing appropriate shift control and over-revolution of the engine 2 and reacceleration at a high shift stage can be prevented thereby.

As a result of the shift-down lower limit shift stage being set based on the determination vehicle wheel speed Vd and downshifting being performed with the shift-down lower limit shift stage as a lower limit, the shift stage at the point of sudden deceleration detection may be kept as it is when the sudden deceleration of the vehicle wheel 5 is detected. Also, even if sudden deceleration of the vehicle wheel 5 is detected, the same shift stage as the speed adaptive shift stage selected in the case of ordinary shift control may be selected. Yet further, even if sudden deceleration of the vehicle wheel 5 is detected, shifting to the lowest shift stage (first speed) may be performed.

Also in the present preferred embodiment, if the shift-down lower limit shift stage setting process of FIG. 3A is to be performed, the vehicle wheel speed detected by the vehicle wheel speed sensor 16 at a time around the detection of the sudden deceleration of the vehicle wheel 5 (for example, immediately before the detection of the sudden deceleration or at a predetermined time before the meeting of the clutch disengage conditions) is acquired as the determination vehicle wheel speed Vd. The shift-down lower limit shift stage is set in accordance with the determination vehicle wheel speed Vd. Shifting to an appropriate shift stage can thereby be performed in accordance with the circumstances at the point of detection of the sudden deceleration. There is a high possibility that the vehicle wheel speed differs from the vehicle body speed after the occurrence of the sudden deceleration. Therefore by using the vehicle wheel speed before the occurrence of the sudden deceleration as the determination vehicle wheel speed Vd to set the shift-down lower limit shift stage, a shift-down lower limit shift stage that is suited for the traveling state of the vehicle 1 can be set.

Also in the present preferred embodiment, if the shift-down lower limit shift stage setting process of FIG. 3B is to be performed, the vehicle speed after the detection of the sudden deceleration of the vehicle wheel 5 is predicted the predicted vehicle speed is used as the determination vehicle wheel speed Vd and the shift-down lower limit shift stage is set in accordance with the determination vehicle wheel speed Vd. Shifting to an appropriate shift stage that is in accordance with the speed of the vehicle body can thus be performed even in circumstances where the vehicle wheel speed and the vehicle body speed differ.

Also with the present preferred embodiment, a shift stage that is one stage higher than the highest shift stage at which engine over-revolution occurs at the determination vehicle wheel speed Vd is set as the shift-down lower limit shift stage. Downshifting can thereby be performed to the lowest shift stage possible within a range in which there is no possibility of engine over-revolution occurring even when sudden deceleration of the vehicle wheel 5 occurs.

Also with the present preferred embodiment, the control unit 10 detects the locking of the vehicle wheel 5 as a sudden deceleration (step S1 of FIG. 2A). The sudden deceleration adaptive shift control can thereby be performed reliably when the vehicle wheel 5 becomes locked and therefore engine over-revolution and reacceleration at a high shift stage can be avoided reliably.

Also with the present preferred embodiment, if the vehicle wheel speed exceeds a predetermined speed (0 km/h in the present preferred embodiment) and a predetermined time has elapsed after the vehicle wheel speed exceeds the predetermined speed, the sudden deceleration adaptive shift control is ended and return to the ordinary shift control is performed (see FIG. 4). Appropriate return to the ordinary shift control can thereby be performed and an appropriate shift stage (speed adaptive shift stage) that is in accordance with the rotational speed of the vehicle wheel can thus be selected in the ordinary travel state. Engine over-revolution during sudden deceleration and high shift stage reacceleration can thus be avoided without influencing ordinary travel characteristics.

Also with the present preferred embodiment, if the vehicle wheel speed exceeds a predetermined speed (0 km/h in the present preferred embodiment) and a predetermined time has elapsed from the start of the half-clutch mode, the sudden deceleration adaptive shift control is ended with the shift-down lower limit shift stage set at the first speed that is the default value (see FIG. 4). Appropriate return to the ordinary shift control can thereby be performed after the minimum necessary sudden deceleration adaptive shift control. An appropriate shift stage (speed adaptive shift stage) that is in accordance with the vehicle wheel speed can thus be selected in the ordinary travel state. Engine over-revolution during sudden deceleration and high shift stage reacceleration can thus be avoided without influencing ordinary travel characteristics.

Figure 7:
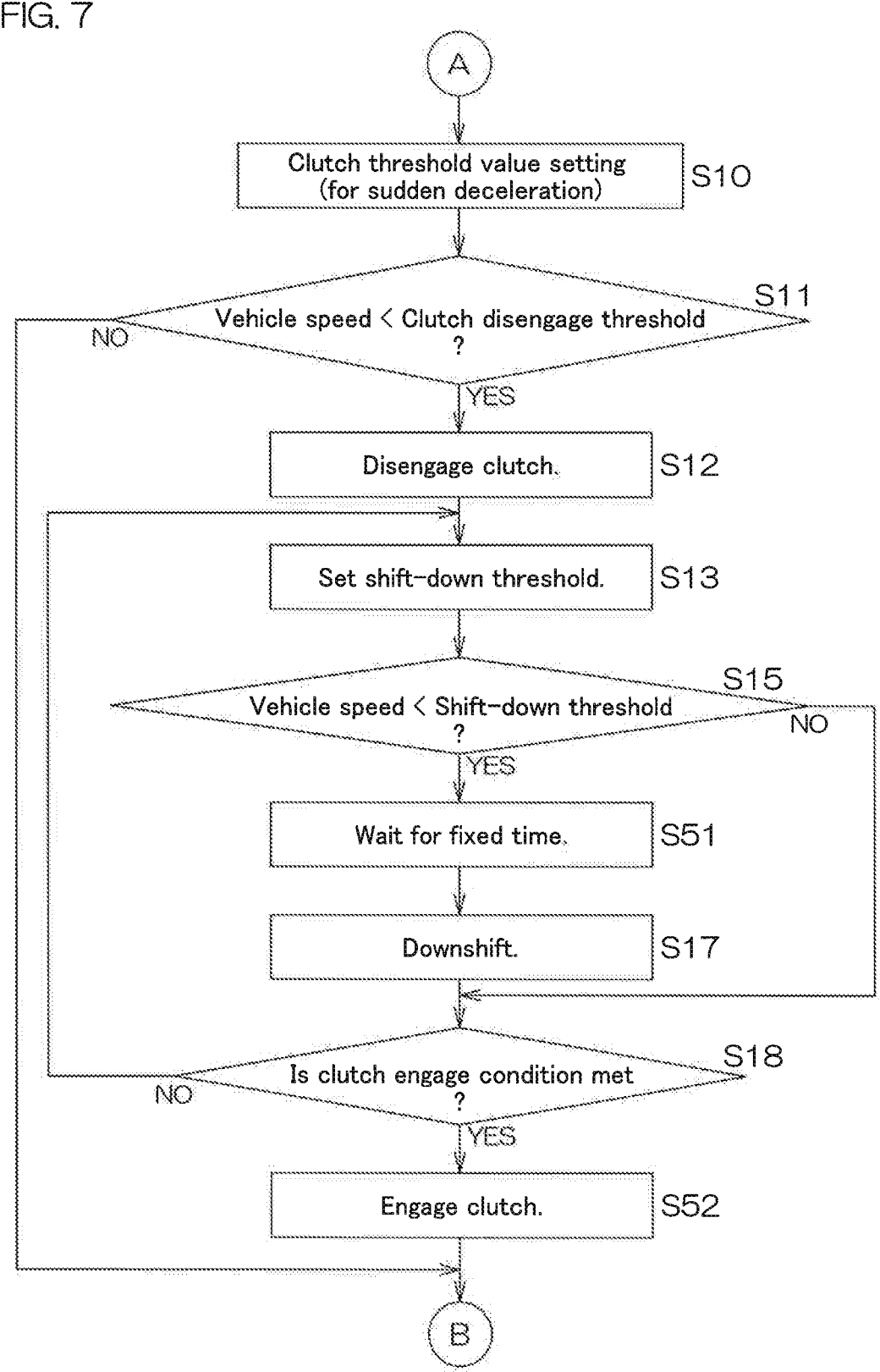
FIG. 7 is a flowchart for describing an auto shift-down control in a vehicle according to another preferred embodiment of the present invention.

FIG. 7 is a flowchart for describing an auto shift-down control in a vehicle according to another preferred embodiment of the present invention. FIG. 1 and FIG. 2A previously described shall be referenced again in the description of the present preferred embodiment. Also in FIG. 7, steps in which the same processes are performed as in the respective steps shown in FIG. 2B are indicated by the same reference symbols as in FIG. 2B. The auto shift-down control according to the present preferred embodiment is a control in which, of the processes shown in FIG. 2A and FIG. 2B, the portions shown in FIG. 2B are replaced by the processes shown in FIG. 7, and the control includes the processes shown in FIG. 2A and FIG. 7.

With the present preferred embodiment, setting and cancellation of the shift-down lower limit shift stage are not performed in the sudden deceleration adaptive shift control. Instead, a fixed waiting time (for example, of 2 seconds) is provided in performing downshifting (step S51). That is, the downshifting by one stage at a time is executed with more time taken than in the ordinary shift control. Downshifting thus progresses more slowly than in the ordinary shift control and therefore, even at the same vehicle wheel speed, a higher shift stage is selected than in the ordinary shift control. Consequently, shifting is performed to a shift stage that is lower than the shift stage at the point of detection of sudden deceleration of the vehicle wheel 5 and higher than the shift stage corresponding to the vehicle wheel speed in the ordinary shift control. Selection of an excessively low shift stage upon occurrence of sudden deceleration, such as vehicle wheel locking, etc., can be avoided thereby and engine over-revolution can thus be avoided when the clutch is reengaged. Also, downshifting is performed and therefore adverse influence on the clutch 3 due to reacceleration at a shift stage that is too high for the vehicle speed after deceleration of the vehicle 1 can be avoided.

The shift-down lower limit shift stage is not set and therefore there is no need to perform the process of resetting the shift-down lower limit shift stage to the default value (see FIG. 4) in the clutch engagement process (step S52).

Although preferred embodiments of the present invention have been described, the present invention may be implemented in yet other modes.

For example, each of the preferred embodiments described above is arranged so that the shift-down threshold, set according to each shift stage, is compared with the vehicle wheel speed and downshifting is performed one stage at a time. However, for example, a shift map, in which an appropriate shift stage is associated with the vehicle wheel speed, may be prepared and a target shift stage may be set in reference to the shift map. In this case, the control unit controls the shift actuator 13 to downshift successively to the target shift stage.

Also, although with the first preferred embodiment, the shift-down lower limit shift stage is set, the setting of the shift-down lower limit shift stage is not necessarily required. That is, the control unit 10 may set a target shift stage in accordance with the determination vehicle wheel speed Vd and control the shift actuator 13 to downshift successively to the target shift stage.

Also, with each of the preferred embodiments, the control unit 10 judges whether or not sudden deceleration has occurred based on the deceleration of the vehicle wheel 5. However, the control unit 10 may judge that sudden deceleration has occurred if the vehicle wheel speed at a predetermined time (for example, 200 milliseconds) before the meeting of the clutch disengage condition is not less than a predetermine value. Also, the control unit 10 may judge that locking (sudden deceleration) of the vehicle wheel 5 has occurred if the vehicle wheel speed after clutch disengagement is zero and the vehicle speed at a predetermined time therebefore is not less than a predetermine value.

The present application corresponds to Japanese Patent Application No. 2014-254387 filed in the Japan Patent Office on Dec. 16, 2014, and the entire disclosure of the application is incorporated herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A transmission system for a vehicle comprising:
   a clutch disposed in a power transmission path between an engine and a vehicle wheel;
   a transmission disposed in the power transmission path, a clutch actuator that switches the clutch between an engaged state and a disengaged state;
   a shift actuator that switches a shift stage of the transmission;
   a vehicle wheel speed sensor that detects a rotational speed of the vehicle wheel as a detected rotational speed;
   a sudden deceleration detecting unit that detects a predetermined sudden deceleration of the vehicle wheel based on an output signal of the vehicle wheel speed sensor; and
   a shift control unit programmed to execute
      an ordinary shift control of
         controlling the clutch actuator, and further controlling the shift actuator to shift to a speed adaptive shift stage associated in advance with a value of the detected rotational speed, and when the sudden deceleration detecting unit detects the predetermined sudden deceleration of the vehicle wheel, a sudden deceleration adaptive shift control of controlling the clutch actuator, and further controlling the shift actuator to shift to a sudden deceleration shift stage which is lower than an actual shift stage at a time of detection of the predetermined sudden deceleration, and higher than the speed adaptive shift stage associated with the value of the detected rotational speed.

2. The transmission system for the vehicle according to claim 1, wherein the shift control unit is programmed to perform, in the sudden deceleration adaptive shift control, shifting to a shift stage that is in accordance with a value of the detected rotational speed at a time around the detection of the sudden deceleration by the sudden deceleration detecting unit.

3. The transmission system for the vehicle according to claim 1, wherein the shift control unit is programmed to perform, in the sudden deceleration adaptive shift control, shifting to a shift stage that is in accordance with a value of the detected rotational speed at a predetermined time before a clutch disengage condition for disengaging the clutch is met.

4. The transmission system for the vehicle according to claim 1, wherein the shift control unit, in the sudden deceleration adaptive shift control, includes a vehicle speed predicting unit that predicts a vehicle speed after the detection of the sudden deceleration by the sudden deceleration detecting unit, the shift control unit being programmed to perform shifting to a shift stage that is in accordance with the predicted vehicle speed.

5. The transmission system for the vehicle according to claim 1, wherein the shift control unit is programmed to perform, in the sudden deceleration adaptive shift control, setting of a shift-down lower limit shift stage and selection of a shift stage not less than the shift-down lower limit shift stage.

6. The transmission system for the vehicle according to claim 5, wherein the shift control unit is programmed to set the shift-down lower limit shift stage in accordance with a value of the detected rotational speed at a time around the detection of the predetermined sudden deceleration by the sudden deceleration detecting unit.

7. The transmission system for the vehicle according to claim 1, wherein the sudden deceleration detecting unit detects locking of the vehicle wheel as the predetermined sudden deceleration of the vehicle wheel.

8. The transmission system for the vehicle according to claim 1, wherein after the shift control unit is in the sudden deceleration adaptive shift control, the shift control unit is programmed to end the sudden deceleration adaptive shift control and transition to the ordinary shift control when a value of the detected rotational speed exceeds a predetermined speed.

9. The transmission system for the vehicle according to claim 1, wherein after the shift control unit is in the sudden deceleration adaptive shift control, the shift control unit is programmed to end the sudden deceleration adaptive shift control and transition to the ordinary shift control upon elapse of a predetermined time after detection by the vehicle wheel speed sensor of the rotational speed exceeding a predetermined speed.

10. The transmission system for the vehicle according to claim 1, wherein after the shift control unit is in the sudden deceleration adaptive shift control, the shift control is programmed to execute, when engaging the clutch, a half-clutch mode of controlling the clutch actuator so that the clutch is put in a half-clutch state and to end the sudden deceleration adaptive shift control and return to the ordinary shift control upon elapse of a predetermined time from the start of the half-clutch mode.

11. The transmission system for the vehicle according to claim 1, wherein the shift control unit is programmed to set, in the sudden deceleration adaptive shift control, a shift-down lower limit shift stage, which is a lower limit shift stage at which downshifting is allowed, based upon a value of the detected rotational speed detected at a predetermined time before a clutch disengage condition for disengaging the clutch to be in the disengaged state is met.

12. The transmission system for the vehicle according to claim 11, wherein the shift control unit is programmed to perform, in the sudden deceleration adaptive shift control, selection of each shift stage to be not less than the shift-down lower limit shift stage.

13. The transmission system for the vehicle according to claim 12, wherein the shift-down lower limit shift stage is higher than a lowest shift stage of the ordinary shift control.

14. The transmission system for the vehicle according to claim 1, wherein in the sudden deceleration adaptive shift control the shift control unit is programmed to execute the sudden deceleration shift stage so that the sudden deceleration shift stage is higher than the speed adaptive shift stage, while the detected rotational speed is at the value.

15. A transmission system for a vehicle comprising:

a clutch disposed in a power transmission path between an engine and a vehicle wheel;

a transmission disposed in the power transmission path, a clutch actuator that switches the clutch between an engaged state and a disengaged state;

a shift actuator that switches a shift stage of the transmission;

a vehicle wheel speed sensor that detects a rotational speed of the vehicle wheel as a detected rotational speed;

a sudden deceleration detecting unit that detects whether a predetermined sudden deceleration of the vehicle wheel occurs based on the detected rotational speed; and a shift control unit that executes an ordinary shift control in response to the sudden deceleration detecting unit detecting no predetermined sudden deceleration is occurring, and executes a sudden deceleration adaptive shift control in response to the sudden deceleration detecting unit detecting the predetermined sudden deceleration of the vehicle wheel, in the ordinary shift control, the shift control unit controlling the clutch actuator, and further controlling the shift actuator to shift to a current speed adaptive shift stage selected from a plurality of speed adaptive shift stages based upon a value of the detected rotational speed, and in the sudden deceleration adaptive shift control, the shift control unit controlling the clutch actuator, and further controlling the shift actuator to shift to a current sudden deceleration shift stage selected from a plurality of sudden deceleration shift stages based upon the value of the detected rotational speed or a predicted speed, the current sudden deceleration shift stage being lower than an actual shift stage at the time of detection of the predetermined sudden deceleration, and higher than the current speed adaptive shift stage executed in the ordinary shift control with the detected rotational speed.

16. The transmission system for the vehicle according to claim 15, wherein the shift control unit is programmed to set, in the sudden deceleration adaptive shift control, a shift-down lower limit shift stage, which is a lower limit shift stage at which downshifting is allowed, based upon a value of the detected rotational speed detected at a predetermined time before a clutch disengage condition for disengaging the clutch to be in the disengaged state is met.

17. The transmission system for the vehicle according to claim 16, wherein the shift control unit is programmed to perform, in the sudden deceleration adaptive shift control, selection of each shift stage of the sudden deceleration shift stages to be not less than the shift-down lower limit shift stage.

18. The transmission system for the vehicle according to claim 17, wherein the shift-down lower limit shift stage is higher than a lowest shift stage of the speed adaptive shift stages.

19. The transmission system for the vehicle according to claim 15, wherein in the sudden deceleration adaptive shift control, the shift control unit is programmed to shift to the current sudden deceleration shift stage so that the current sudden deceleration shift stage is higher than the current speed adaptive shift stage, while the detected rotational speed is at the value.

* * * * *